United States Patent
Yousef et al.

(10) Patent No.: US 12,109,540 B1
(45) Date of Patent: Oct. 8, 2024

(54) MULTIFUNCTIONAL DISELENIDE-BASED POLYIMIDE MEMBRANE FOR GAS SEPARATION AND PURIFICATION

(71) Applicant: IMAM MOHAMMAD IBN SAUD ISLAMIC UNIVERSITY, Riyadh (SA)

(72) Inventors: Tarek Ahmed Yousef, Riyadh (SA); Saad Shaaban, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/657,831

(22) Filed: May 8, 2024

(51) Int. Cl.
| | |
|---|---|
| B01D 53/22 | (2006.01) |
| B01D 67/00 | (2006.01) |
| B01D 71/64 | (2006.01) |
| C08G 73/10 | (2006.01) |
| C08J 5/18 | (2006.01) |

(52) U.S. Cl.
CPC ........... *B01D 71/64* (2013.01); *B01D 53/228* (2013.01); *B01D 67/0011* (2013.01); *B01D 67/0013* (2013.01); *C08G 73/1085* (2013.01); *C08J 5/18* (2013.01); *B01D 2053/221* (2013.01); *C08J 2379/08* (2013.01)

(58) Field of Classification Search
CPC ............ B01D 67/0013; B01D 67/0011; B01D 71/64; B01D 53/228; B01D 2053/221; C08J 2379/08; C08J 5/18; C08G 73/1085
See application file for complete search history.

(56) References Cited

U.S. PATENT DOCUMENTS 3,595,971 A * 7/1971 behr .................. C08G 73/1003
528/229
4,479,930 A * 10/1984 Hnatowich ........ A61K 51/1093
534/10

(Continued)

FOREIGN PATENT DOCUMENTS

| CN | 112521605 A | 3/2021 |
|---|---|---|
| CN | 112574412 A | 3/2021 |

OTHER PUBLICATIONS

Qilong Li et al., Selenide-containing soluble polyimides: High refractive index and redox responsiveness, Nov. 9, 2019, 3 pages.

*Primary Examiner* — Anthony R Shumate
(74) *Attorney, Agent, or Firm* — Oblon, McClelland, Maier & Neustadt, L.L.P.

(57) ABSTRACT

A polyimide membrane based on a polymer comprising polymerized units of a diselenide compound and having Formula I. A method of fabrication of the membrane using the polyimide-containing polymer and a method for separating one or more gases from a gaseous mixture using the membrane.

15 Claims, 3 Drawing Sheets

Formula I

(56) References Cited

U.S. PATENT DOCUMENTS

| | | | | |
|---|---|---|---|---|
| 6,322,624 | B1* | 11/2001 | Titterington | C09D 11/34 |
| | | | | 585/27 |
| 10,689,464 | B2* | 6/2020 | Dusankova | C08J 5/18 |
| 11,827,525 | B1* | 11/2023 | Abdulkhair | B82Y 40/00 |
| 11,851,399 | B1* | 12/2023 | Shabaan | C07C 391/02 |
| 12,006,293 | B1* | 6/2024 | Shaaban | A61K 31/4375 |
| 2014/0047976 | A1* | 2/2014 | Yeong | B01D 71/76 |
| | | | | 96/10 |
| 2015/0143995 | A1* | 5/2015 | Umehara | B01D 67/006 |
| | | | | 96/13 |
| 2016/0256833 | A1* | 9/2016 | Itoh | B01D 69/107 |
| 2019/0010290 | A1 | 1/2019 | Zhu et al. | |
| 2019/0391420 | A1* | 12/2019 | Murakami | C08G 73/10 |
| 2021/0125741 | A1* | 4/2021 | Hsiao | C01B 32/182 |
| 2023/0203207 | A1* | 6/2023 | DeVore | C08H 1/06 |
| | | | | 514/17.2 |

* cited by examiner

MULTIFUNCTIONAL DISELENIDE-BASED POLYIMIDE MEMBRANE FOR GAS SEPARATION AND PURIFICATION

BACKGROUND

Technical Field

The present disclosure is directed to a polyimide membrane based on a polymer containing repeating units of a diselenide compound, and its use in gas separation and purification processes.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Gas separation is a method used in various industrial processes to remove or separate certain gases, usually impurities and undesired compounds, from a mixture of gases. Gases such as carbon dioxide and hydrogen sulfide are often released into the air along with other gases or are burned while they are released from a separation vessel into the air during the separation process; however, such methods pollute the environment. The release of gases such as carbon dioxide contribute to global warming and climate change via the greenhouse effect. An environment-friendly approach to the release of toxic and polluting gases is the development of gas separation methods, wherein the gases that are removed from the gaseous mixture can be transformed and/or directed and stored in containers for use in other applications.

Currently, many methods are being used for the separation of gases, one of which is separation by using solvents or adsorbents. This method is centered on the affinity of a gas for a particular sorbent, such as activated carbon. The gas having an affinity for the sorbent is held, fixed, and/or adsorbed by the sorbent itself, while the other gases not having an affinity for the sorbent pass through or over the sorbent. This method, however, requires a higher amount of energy to operate and a need for a revival of the system for further use, which increases the overall cost of the process.

Separation of gas may also be done through the process of distillation. For example, in cryogenic distillation, gases in a mixture are first liquefied and passed through a distillation column where the separation is achieved by altering the temperature and/or pressure of the column; however, distillation may not be a preferred choice for gas separation as it is energy-intensive and is more appropriate for mixtures having the desired gas in high concentrations.

Another method for gas separation is the use of membranes, where the gases having a higher affinity for the membrane are retained and any the other gases pass through the membrane. This method does not require high amounts of energy for its functioning. Further, the cost-effectiveness of a membrane method and the simplicity of the system make it a desirable method for gas separation. Materials such as polymers, ceramics, nanocomposites, metals, and the like are widely used in the synthesis of membranes for gas separation.

Membranes may be selected based on their thickness, hydrophilicity, pore sizes, permeability stability, topology, intrinsic properties, and the like. Various polymers have been devised to possess characteristics specific to a task, such as use in a gas separation method. More commonly membranes used are those based on cellulose acetate, polydimethylsiloxane, copolymers made of polyether and polyamide, polyimides, and the like. The industrial processes depends on efficient gas separation and purification processes to optimize production and meet quality standards and regulations. Traditionally, membranes used in gas separation methods often face challenges, such as selectivity limitations, low permeability, and chemical degradation sensitivity. These challenges inhibit the industry's ability to achieve optimal gas separation and purification efficiency, leading to increased energy consumption, reduced productivity, and potential environmental problems. Further, there is an inverse relationship between the permeability and selectivity of the membranes towards a particular gas. A highly permeable membrane may not have high selectivity for a gas component, and a highly selective membrane may not be highly permeable, which makes the separation process more time-consuming. For example, in petroleum applications, certain membranes may offer high permeability but may not be able to selectively absorb specific gases, including methane, carbon dioxide, and/or hydrogen. Without efficiency, separation processes are less effective, resulting in lower purity of products and higher operating costs.

Polyimide based membranes are an advantageous membrane as they have enhanced thermal and chemical stability. One problem in the development of polyimide membranes is the difficultly in imparting selective gas adsorption abilities in these membranes while keeping a high permeability.

Accordingly, an object of the present disclosure to provide an efficient polymer-based membrane that is multifunctional and possess selective gas adsorption abilities along with higher permeabilities that overcomes shortcomings of known polyimide membranes.

SUMMARY

In an exemplary embodiment, a polyimide including reacted units of a 4,4'-diselanediyldianiline and reacted units of an ethylenediaminetetraacetic dianhydride is described. The reacted units of the 4,4'-diselanediyldianiline are bonded to the reacted units of the ethylenediaminetetraacetic dianhydride through one or more imides in an alternating pattern.

In some embodiments, the polyimide includes a molar ratio of the 4,4'-diselanediyldianiline to the total amount of the ethylenediaminetetraacetic dianhydride of 1:1.

In some embodiments, the polyimide is made by a process of dissolving the 4,4'-diselanediyldianiline in a polar organic solvent to form a solution, then adding the ethylenediaminetetraacetic dianhydride to the solution, stirring the solution for a time sufficient to form a poly(amic acid), and heating the poly(amic acid) to a temperature of 170 to 200° C. for 8 to 10 hours to form the polyimide.

In some embodiments, the process of making the polyimide comprises stirring the solution for from 10 to 14 hours.

In some embodiments, the polyimide comprises having repeating units of Formula I:

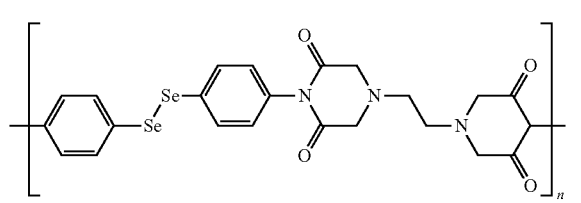

Formula I wherein n=2-1000.

In some embodiments, a membrane comprising the polyimide is described.

In some embodiments, the membrane is made by a process comprising dissolving the polyimide in a polar organic solvent to form a casting solution, casting the casting solution on a substrate, and heating the substrate with the casting solution progressively to form the membrane.

In some embodiments, the polyimide is an amount of 10 to 30 weight percent (wt. %) of the casting solution based on a total weight of the casting solution.

In some embodiments, the substrate is a silica substrate.

In some embodiments, the process of heating the substrate with the casting solution progressively is held at a first temperature of 50 to 70° C. for 10 to 30 hours.

In some embodiments, the process of heating the substrate with the casting solution progressively is held at a second temperature of 90 to 110° C. for 4 to 8 hours.

In some embodiments, the process of heating the substrate with the casting solution progressively is held at a third temperature of 140 to 160° C. for 10 to 30 hours.

In some embodiments, a method of gas separation is described. The method comprises contacting the polyimide membrane with a gaseous mixture. The gaseous mixture comprises at least two gases, and at least a portion of a first gas of the gaseous mixture is permeated through the membrane to form a permeate gas having a greater concentration of the first gas than the concentration of the first gas in the gaseous mixture.

In some embodiments, the separation includes adsorbing one of the at least two gases on the membrane.

In some embodiments, the gaseous mixture includes hydrogen, nitrogen, methane, carbon monoxide, carbon dioxide, and hydrogen sulfide.

These and other aspects of the non-limiting embodiments of the present disclosure will become apparent to those skilled in the art upon review of the following description of specific non-limiting embodiments of the disclosure in conjunction with the accompanying drawings. The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof will be readily obtained as the same becomes better understood by reference to the following detailed description when considered in connection with the accompanying drawings, wherein.

DESCRIPTION

Figure 1:
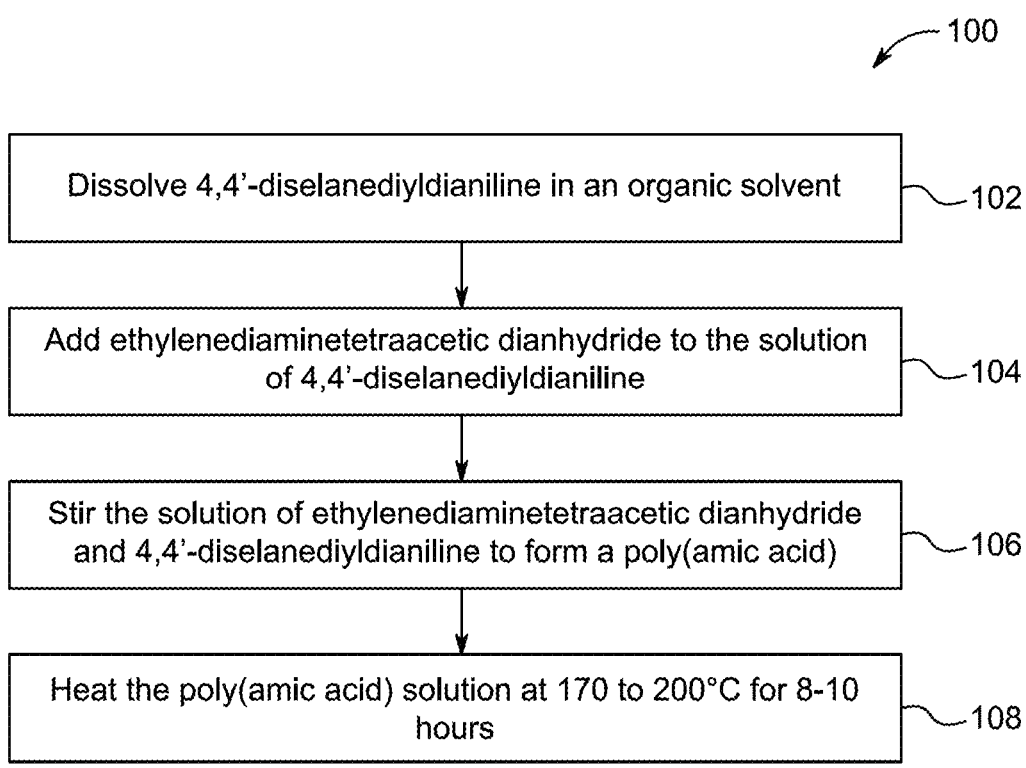
FIG. 1 is a flowchart depicting a method of preparation of a polyimide polymer, according to certain embodiments.

In the following description, it is understood that other embodiments may be utilized, and structural and operational changes may be made without departure from the scope of the present embodiments disclosed herein.

Reference will now be made to specific embodiments or features, examples of which are illustrated in the accompanying drawings. In the drawings, whenever possible, corresponding or similar reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

As used herein, the words "about," "approximate," "approximately," "substantially similar" and similar terms generally refer to ranges that include the identified value with a margin of 20%, 10%, or preferably 5%, and any values therebetween. Within the description of this disclosure, where a numerical limit or range is stated, the endpoints are included unless stated otherwise. Also, all values and subranges within a numerical limit or range are specifically included as if explicitly written out.

As used herein, the term "compound" refers to a chemical entity that includes reacted atoms, or molecules having atoms of two or more chemical elements. Compounds may exist as a solid, liquid, gas, plasma, and the like, and/or a combination thereof. Compounds may also exist in a crude mixture or may be isolated and purified.

As used herein, the term "membrane" refers to a layer of semi-permeable material that may be used for filtration. A membrane may be a porous structure that is usually made of a polymer, ceramic material, and/or metals in some cases. Membranes may also be used to filter solutes, solids, particulate matter, and/or colloids from a solution. A membrane is preferably a selective barrier, in that it allows some particles to pass through, but stops other particles. Membranes can be neutral or charged, and particle transport may be active and/or passive. Active transport may be facilitated by pressure, concentration, chemical gradients, and/or electrical gradients.

As used herein, the term "polymer" refers to a class of natural or synthetic substances composed of large molecules (macromolecules) that are contain of multiples of simpler chemical units (or subunits) sometimes referred to as monomers. A polymer is a larger molecule made of multiple smaller units of smaller molecules (monomers), repeating themselves in an ordered or random arrangement.

As used herein, "molar ratio" refers to a ratio of the amounts in moles of the compounds present in a mixture or compounds participating in a chemical reaction.

As used herein, "pore size" refers to a width between two opposite walls of a pore. A pore size may be considered as the diameter or longest dimensions of a pore opening.

As used herein, the term "permeate" refers to the filtrate and/or gas that passes through a membrane and may be collected. A feed may be passed over, passed through, or otherwise contacted with a membrane, and any material (gas, liquid, solid, and the like) which passes through the membrane is a permeate and any material which does not pass through the membrane is referred to as a "retentate."

As used herein, the term "casting" refers to a process of forming a thin layer of a solution on a substrate, wherein the layer undergoes thickening and solidification during the process. An example of casting includes drop-casting, where at least one drop of liquid containing a suspension of a material of interest is deposited on a substrate to form layers on the material of interest.

As used herein, the term "substrate" refers to a solid, preferably rigid, material on which a polymeric solution may be spread to form a membrane. Substrates may be thin and free of chemical features and/or defects. The polymeric solution may be deposited onto the substrate in layers, where the substrate may act as a solid support.

As used herein, the term "selectivity" refers to the affinity of a membrane towards a specific substance, especially one or more gases, and preferably one gas.

As used herein, the term "permeability" refers to the characteristic of a membrane to allow one or more selected substances to pass through and/or over the membrane.

As used herein, the term "solution" refers to a mixture of two or more components wherein the mixture is homogeneous.

As used herein, the term "solvent" refers to a substance in which a solute is dissolved to form a solution.

As used herein, the term "adsorption" refers to the attachment of molecules, ions, or atoms, and the like to a solid surface.

The weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

Aspects of the present disclosure are directed to a polymer membrane preferably a polyimide membrane, (also referred to as membrane), more particularly to a polyimide membrane based on a diselenide monomer unit. The membrane of the present disclosure has enhanced thermal stability, chemical resistance, mechanical resistance, electrical insulation properties, and gas separation capabilities, which can be attributed to the incorporation of a diselenide group in the polymer.

Disclosed herein is a membrane prepared from a modified polyimide containing units of a diselenide compound, wherein the modified polyimide comprises repeating units of Formula I:

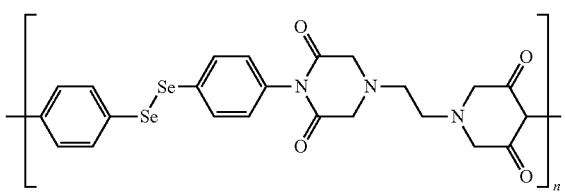

Formula I wherein "n" refers to the number of repeating units. In one embodiment, "n" may range from 2 to 1000. In some embodiments, "n" may range from 20 to 800, preferably 50 to 500, and more preferably 100 to 400.

In some embodiments, the polyimide polymer comprises units of 4,4'-diselanediyldianiline and an ethylenediaminetetraacetic dianhydride, wherein the units of 4,4'-diselanediyldianiline and an ethylenediaminetetraacetic dianhydride are bonded together through at least one imide unit, preferably two imide units, and more preferably two or more imide units. The 4,4'-diselanediyldianiline may also be referred to as units of 4,4'-diselanediyldianiline and 4,4'-diselanediyldianiline units. The ethylenediaminetetraacetic dianhydride may also be referred to as units of ethylenediaminetetraacetic dianhydride and ethylenediaminetetraacetic dianhydride units.

In some embodiments, the units of 4,4'-diselanediyldianiline and an ethylenediaminetetraacetic dianhydride are bonded together in an alternating pattern, for example, the polyimide may be made of a first unit of 4,4'-diselanediyldianiline followed by a first unit of an ethylenediaminetetraacetic dianhydride followed by a second unit of 4,4'-diselanediyldianiline followed by a second unit of an ethylenediaminetetraacetic dianhydride, and so on. In some embodiments, the units of 4,4'-diselanediyldianiline are added to the units of ethylenediaminetetraacetic dianhydride in equal molar proportions to form the polyimide polymer. In specific embodiments, the units of 4,4'-diselanediyldianiline are added to the units of ethylenediaminetetraacetic dianhydride in a molar ratio of 1:1.

FIG. 1 depicts a method 100 for the synthesis of a polyimide polymer according to embodiments of the present disclosure. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes optionally dissolving 4,4'-diselanediyldianiline in an organic solvent. The organic solvent may be polar or non-polar. In a preferred embodiment, the organic solvent is a polar organic solvent. Suitable polar organic solvents include, but are not limited to acetone, acetonitrile, dimethylformamide (DMF), dimethyl sulfoxide (DMSO), dimethyl acetamide (DMA), isopropanol, methanol, and the like, and/or a combination thereof. In a preferred embodiment, the 4,4'-diselanediyldianiline is dissolved in DMA.

In some embodiments, the 4,4'-diselanediyldianiline is mixed with the organic solvent until a clear solution is obtained. A clear solution indicates the complete dissolution of the 4,4'-diselanediyldianiline in the organic solvent. The mixing may be done by hand with a glass rod, by shaking, with instruments, such as a sonicator, a vortex, a stir plate and magnetic stir bar, and the like.

At step 104, the method 100 includes addition of ethylenediaminetetraacetic dianhydride to the solution of 4,4'-diselanediyldianiline. In some embodiments, ethylenediaminetetraacetic dianhydride and 4,4'-diselanediyldianiline are mixed in equal molar proportions to form a solution. In specific embodiments, the units of 4,4'-diselanediyldianiline are added to the units of ethylenediaminetetraacetic dianhydride in a molar ratio of 5:1 to 1:5, preferably 4:1 to 1:4, preferably 3:1 to 1:3, more preferably 2:1 to 1:2, and yet more preferably about 1:1.

At step 106, the method 100 includes stirring the solution of ethylenediaminetetraacetic dianhydride and 4,4'-diselanediyldianiline to form a poly(amic acid). In certain embodiments, the solution is stirred for a period of 10 to 14 hours, preferably for a period of 11 to 13 hours, and more preferably for a period of about 12 hours, to form the poly(amic acid). Stirring the solution helps obtain and maintain a uniform concentration of the ethylenediaminetetraacetic dianhydride and 4,4'-diselanediyldianiline in the mixture. In one embodiment, the stirring may be done manually or by using a stirrer. Suitable examples of stirrers that may be used include a magnetic stir bar and a stir plate, a stirring rod, an impeller, a shaking platform, and the like. In a preferred embodiment, the stirrer is a magnetic stir bar and a stir plate.

The poly(amic acid) solution, thus obtained, may be viscous, and the addition of a polar organic solvent to the poly(amic acid) solution is preferred. Any polar organic solvent may be used to dilute the poly(amic acid) solution. In certain embodiments, the polar organic solvent is dimethyl acetamide.

At step 108, method 100 includes heating the poly(amic acid) solution to a temperature of 170 to 200° C. to form the polyimide. In one embodiment, the poly(amic acid) solution is heated to temperatures of 170 to 200° C., preferably 175 to 195° C., and more preferably 180 to 190° C. In certain embodiments, the poly(amic acid) solution is heated for a period of 8 to 10 hours, preferably about 9 hours, to form the polyimide. In a preferred embodiment, the poly(amic acid) solution is heated to a temperature of 180 to 190° C. for a period of 9 hours to form the polyimide (e.g., "the polyimide" or "the polyimide polymer").

In some embodiments, the polyimide product obtained is cooled to room temperature. This step is followed by the addition of an organic solvent, preferably methanol. The organic solvent may be at a temperature lower than room temperature, for example, 20° C., 10° C., 0° C., and the like, and the addition of the organic solvent may be gradual to ensure proper mixing of the solvent and the polyimide product to precipitate the polyimide product. In some embodiments, the polyimide product is filtered, followed by washing with an organic solvent. In a preferred embodiment, the organic solvent is methanol. After washing, the polyimide product is dried at temperatures of about 80 to 120° C., preferably at temperatures of 90 to 110° C., and more preferably at a temperature of about 100° C. The drying may be carried out for a period of 10 to 15 hours, preferably for a period of 11 to 14 hours, more preferably for a period of 12 to 13 hours, and yet more preferably for a period of about 12 hours, to obtain the final polyimide. In a preferred embodiment, the drying may be carried out for a period of 12 hours to obtain the polyimide product in powder form.

Figure 2:
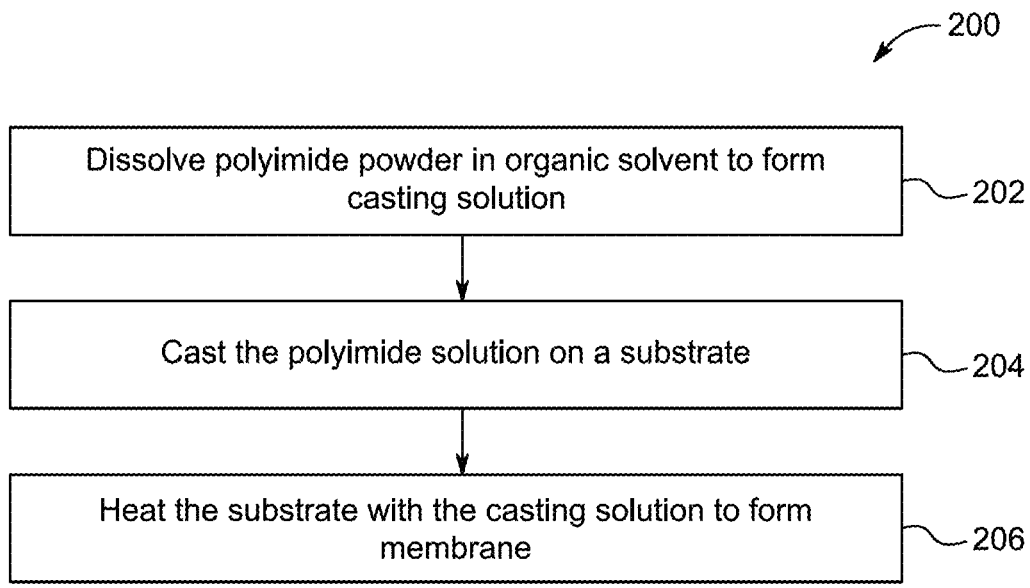
FIG. 2 is a flowchart depicting a method of fabrication of a membrane using a polyimide polymer, according to certain embodiments.

The polyimide polymer thus prepared is used to fabricate a porous membrane for gas separation. FIG. 2 illustrates a schematic flow diagram describing a method 200 for fabricating a membrane comprising the polyimide. The order in which the method 200 is described is not intended to be construed as a limitation, and any number of the described method steps can be combined in any order to implement the method 200. Additionally, individual steps may be removed or skipped from the method 200 without departing from the spirit and scope of the present disclosure.

At step 202, the method 200 includes dissolving the polyimide powder in an organic solvent to form a casting solution. The polyimide has a high solubility in polar solvents, so polar organic solvents may be the preferred choice. In one embodiment, the polyimide may be dissolved in a single polar organic solvent. In another embodiment, the polyimide may be dissolved in a mixture of two or more polar organic solvents. Preferred solvents for dissolving the polyimide may be selected from a group consisting of, but not limited to, water, acetone, acetonitrile, DMF, DMSO, DMA, isopropanol, methanol, and the like, and mixtures thereof. In some embodiments, the polyimide powder is dissolved in DMF to form the casting solution. In certain embodiments, the polyimide powder is dissolved in DMA to form the casting solution. The amount of the polyimide in the casting solution may depend on the molecular weight of the polyimide and may be expressed in terms of weight percent. In some embodiments, the amount of polyimide may range from 10 to 30 weight percent (wt. %), preferably 12 to 28 wt. %, preferably 14 to 26 wt. %, preferably 16 to 24 wt. %, more preferably 18 to 22 wt. %, and yet more preferably 19 to 21 wt. %, of the casting solution, based on a total weight of the cast solution. In a preferred embodiment, the amount of polyimide may be in an amount about 20 wt. % of the casting solution.

At step 204, the method 200 includes casting the polyimide solution (i.e., the casting solution) on a substrate. The substrate may be a material that is inert. In one embodiment, the polyimide solution is cast on a porous substrate that allows the passage of permeate through it. In some embodiments, the substrate may be used as a support to form the membrane but not participate in a gas separation process. Suitable substrates can be selected from a group comprising, but not limited to, silica, glass, metal, polymeric resins, nylon, ceramic, and the like. In one embodiment, the polyimide solution may be cast on a glass substrate. In another embodiment, the polyimide solution may be cast on a silica substrate.

At step 206, the method 200 includes heating the substrate with the casting solution to form the membrane. Heating results in the formation of a solid, compact layer of the casting solution on the substrate. In some embodiments, the substrate and the casting solution are heated progressively to form the membrane by evaporation of the solvent. Progressive heating is used as it improves the selectivity of the membrane by removing defects that may be formed in the membrane layer during synthesis, including heating the membrane initially to a high temperature. Progressive heating may be performed by gradually increasing the temperature of the solution for a specific period. According to the present disclosure, the casting solution and the substrate are heated at three different temperatures, namely a first temperature, a second temperature, and a third temperature, wherein the second temperature is higher than the first temperature and the third temperature is higher than the second temperature. In one embodiment, the casting solution and the substrate are heated at first temperatures of about 50 to 70° C., preferably 52 to 68° C., preferably 54 to 66° C., preferably 56 to 64° C., more preferably 58 to 62° C., and yet more preferably about 60° C. for a period of 10 to 30 hours, preferably 14 to 28 hours, preferably 18 to 26 hours, more preferably 22 to 24 hours, and yet more preferably about 24 hours. In a preferred embodiment, the casting solution and the substrate may be heated at first temperatures of about 60° C. for a period of about 24 hours.

In some embodiments, after heating at first temperatures, the casting solution and the substrate are heated at second temperatures of about 90 to 110° C., preferably 91 to 109° C., preferably 92 to 108° C., preferably 93 to 107° C., preferably 94 to 106° C., preferably 95 to 105° C., preferably 96 to 104° C., preferably 97 to 103° C., preferably 98 to 102° C., more preferably 99 to 101° C., and yet more preferably about 100° C. The casting solution and the substrate may be heated at second temperature for a period of 4 to 8 hours, preferably 5 to 7 hours, and more preferably about 6 hours. In a preferred embodiment, the casting solution and the substrate may be heated at second temperatures of about 100° C. for a period of about 6 hours.

Heating the casting solution and the substrate at the second temperature is followed by heating to a third temperature which is higher, e.g., temperatures in a range of 140 to 160° C., preferably 141 to 159° C., preferably 142 to 158° C., preferably 143 to 157° C., preferably 144 to 156° C., preferably 145 to 155° C., preferably 146 to 154° C., preferably 147 to 153° C., preferably 148 to 152° C., more preferably 149 to 151° C., and yet more preferably about 150° C. for a period of 10 to 30 hours, preferably 14 to 28 hours, preferably 18 to 26 hours, more preferably 22 to 24 hours, and yet more preferably about 24 hours. In a preferred embodiment, the heating may be carried out at a third temperature of about 150° C. for a period of about 24 hours to obtain the membrane comprising the polyimide.

Figure 3:
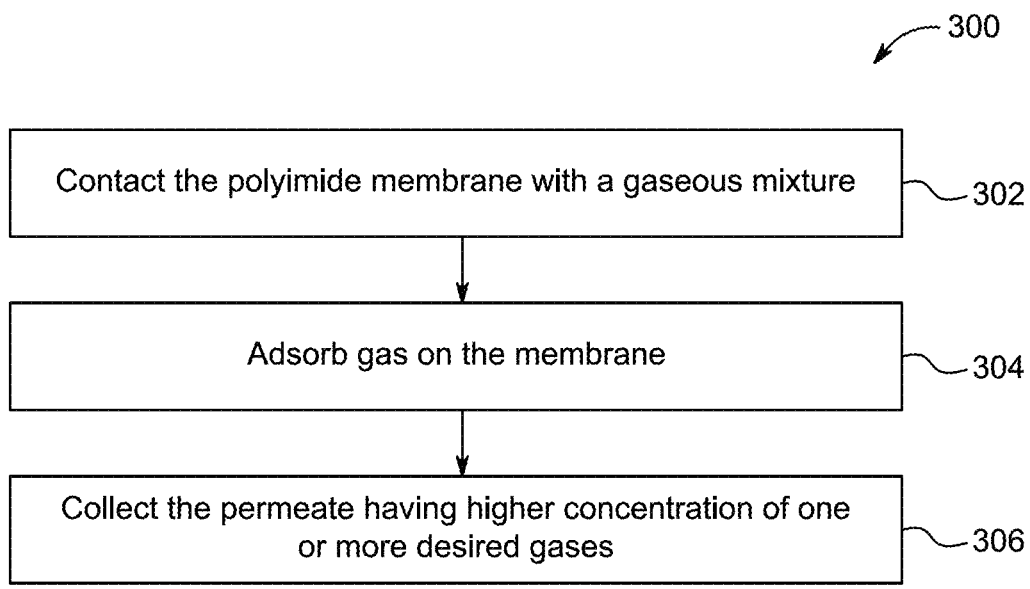
FIG. 3 is a flowchart depicting a method of gas separation, according to certain embodiments.

FIG. 3 illustrates a schematic flow diagram describing a method 300 for gas separation using the polyimide membrane. The method 300 includes the separation of one or more gases from a mixture of gases wherein the separation is performed by selective adsorption and/or exclusion of one or more gases on the membrane to permit selective permeation of certain gases through the membrane. The order in which the method 300 is described is not intended to be construed as a limitation, and any number of the described method steps can be combined in any order to implement the method 300. Additionally, individual steps may be removed or skipped from the method 300 without departing from the spirit and scope of the present disclosure.

At step 302, the method 300 includes contacting the polyimide membrane of the present disclosure with a gaseous mixture. The gaseous mixture may contain atmospheric gases, including hydrogen, oxygen, carbon dioxide, nitrogen, and the like. It may also contain other gases such as methane, carbon monoxide, hydrogen sulfide, or trace gases, including helium, argon, and neon, and the like. The gaseous mixture may contain any number of gases or any possible combination of gases having different molecular weights. In a preferred embodiment, the gaseous mixture comprises at least two gases.

At step 304, the method 300 includes adsorbing gas on the polyimide membrane. In some embodiments, this may include the passage of the gaseous mixture through the membrane during which one or more gases are adsorbed on the membrane. In an example, where the gaseous mixture contains two gases, the method preferably includes the adsorption of at least one gas on the membrane. The adsorption of one gas or one or more gases on the membrane depends on the selectivity of the membrane for those gases. For example, when a gaseous mixture containing hydrogen, nitrogen and carbon dioxide is passed through a membrane having selectivity for hydrogen, the nitrogen and carbon dioxide gases may pass through the membrane while hydrogen may be adsorbed on the membrane. In some embodiments, the gaseous mixture may pass over the membrane and one or more gases may be adsorbed on the membrane.

At step 306, method 300 includes collecting the permeate containing one or more gases, wherein the concentration of the one or more gases in the permeate is higher than the concentration of these gases in the gaseous mixture. For example, if a gaseous mixture containing methane, carbon monoxide, and hydrogen sulfide is passed through the membrane having selectivity for methane and carbon monoxide, the permeate will have hydrogen sulfide at a concentration higher than the concentration of hydrogen sulfide in the gaseous mixture containing the three gases.

The selectivity of the membranes can be altered such that either the desirable or undesirable gases may be adsorbed onto the membrane. In the case where a membrane has selectivity for undesirable gases, the permeate may contain only the desirable gas, and the undesirable gases will be retained on the membrane and/or excluded from permeating therethrough and vice-versa. The polyimide membranes of the present invention, being highly selective and highly permeable, find uses in gas separation processes in various industries such as petrochemical, chemical, natural gas recovery, oil and gas refineries, and the like.

EXAMPLES

The disclosure will now be illustrated with working examples, which are intended to illustrate the working of the disclosure and not intended to restrictively imply any limitations on the scope of the present disclosure, as many variations thereof are possible without departing from the spirit and scope of the present disclosure. The working examples depict an example of the polyimide of the present disclosure. The following examples demonstrate the synthesis of a polyimide and membrane fabricated with the polyimide, as disclosed herein. The examples are provided solely for illustration and are not to be construed as limitations of the present disclosure.

Example 1: Synthesis of the Polyimides

Figure 4:
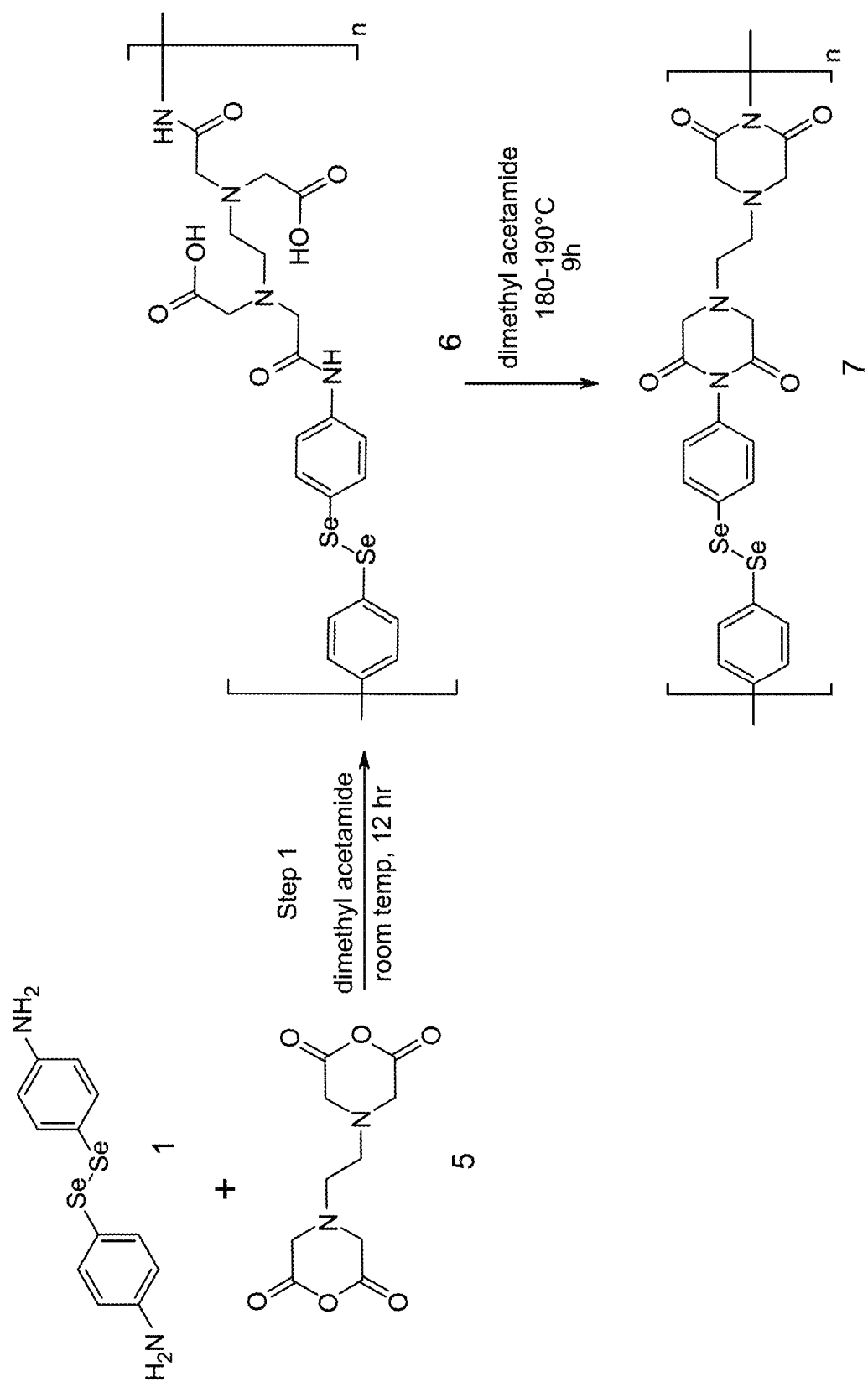
FIG. 4 is a schematic illustration depicting a process of preparing a polyimide polymer according to certain embodiments.

A schematic illustration describing the preparation of the polyimide polymer is depicted in FIG. 4. Under argon, 4,4'-diselanediyldianiline (1) (5 mmol) and dimethyl acetamide (12 mL) were mixed till a clear solution and complete dissolution of the diamine was observed. After that, ethylenediaminetetraacetic dianhydride (5) (5 mmol) was added. The solution was stirred at room ambient temperature for 12 hours overnight. After that, dimethyl acetamide (12 mL) was then added to the formed poly(amic acid) (6) viscous mixture, and the reaction was attached to a water condenser and Dean-Stark trap. The reaction was heated to 180-190° C. for 9 hours. The reaction was cooled to room temperature, and cold methanol was carefully and gradually added. The formed product (7) was filtered and washed with hot methanol and dried at 100° C. for 12 hours.

Example 2: Membrane Fabrication

The polyimide membrane was prepared by dissolving the polyimide powder (20 wt. %), as prepared in FIG. 4, in DMF (5 mL) to form the casting solution. The solutions were cast onto glass plates and heated at 60° C. for one day, then at 100° C. for 6 hours, and finally at 150° C. for another one day, to obtain the diselenide-based polyimide membrane.

Numerous modifications and variations of the present disclosure are possible in light of the above teachings. Therefore, it is to be understood that within the scope of the appended claims, the disclosure may be practiced other than as specifically described herein.

The invention claimed is:

1. A polyimide, comprising:
   reacted units of a 4,4'-diselanediyldianiline; and
   reacted units of an ethylenediaminetetraacetic dianhydride,
   wherein the reacted units of the 4,4'-diselanediyldianiline are bonded to the reacted units of the ethylenediaminetetraacetic dianhydride through one or more imides in an alternating pattern.

2. The polyimide of claim 1, wherein a molar ratio of the 4,4'-diselanediyldianiline to the total amount of the ethylenediaminetetraacetic dianhydride is 1:1.

3. The polyimide of claim 1, wherein the polyimide is made by a process comprising:
   dissolving the 4,4'-diselanediyldianiline in a polar organic solvent to form a solution;
   adding the ethylenediaminetetraacetic dianhydride to the solution;
   stirring the solution for a time sufficient to form a poly(amic acid); and
   heating the poly(amic acid) to a temperature of 170 to 200° C. for 8 to 10 hours to form the polyimide.

4. The polyimide of claim 3, wherein the process of making the polyimide comprises stirring the solution for from 10 to 14 hours.

5. The polyimide of claim 1, having repeating units of Formula I:

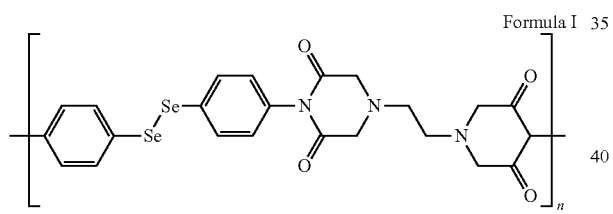

Formula I wherein n=2–1000.

6. A membrane, comprising: the polyimide of claim 1.

7. The membrane of claim 6, wherein the membrane is made by a process comprising:
   dissolving the polyimide in a polar organic solvent to form a casting solution,
   casting the casting solution on a substrate; and
   heating the substrate with the casting solution progressively to form the membrane.

8. The membrane of claim 7, wherein the polyimide is 10 to 30 weight percent of the casting solution.

9. The membrane of claim 7, wherein the substrate is a silica substrate.

10. The membrane of claim 7, wherein the progressive heating is held at a first temperature of 50 to 70° C. for 10 to 30 hours.

11. The membrane of claim 7, wherein the progressive heating is held at a second temperature of 90 to 110° C. for 4 to 8 hours.

12. The membrane of claim 7, wherein the progressive heating is held at a third temperature of 140 to 160° C. for 10 to 30 hours.

13. A method of gas separation, comprising:
   contacting the membrane of claim 6 with a gaseous mixture,
   wherein the gaseous mixture comprises at least two gases,
   permeating at least a portion of a first gas of the gaseous mixture through the membrane to form a permeate gas having a greater concentration of the first gas than the concentration of the first gas in the gaseous mixture.

14. The method of claim 13, wherein the separating includes adsorbing one of the at least two gases on the membrane.

15. The method of claim 13, wherein the gases mixture comprises hydrogen, nitrogen, methane, carbon monoxide, carbon dioxide, and hydrogen sulfide.